US011395118B2

(12) United States Patent
Higuchi et al.

(10) Patent No.: US 11,395,118 B2
(45) Date of Patent: Jul. 19, 2022

(54) VEHICULAR MICRO CLOUD HUBS

(71) Applicant: Toyota Motor Engineering & Manufacturing North America, Inc., Plano, TX (US)

(72) Inventors: Takamasa Higuchi, Mountain View, CA (US); Seyhan Ucar, Mountain View, CA (US); Onur Altintas, Mountain View, CA (US)

(*) Notice: Subject to any disclaimer, the term of this patent is extended or adjusted under 35 U.S.C. 154(b) by 108 days.

(21) Appl. No.: 16/735,612

(22) Filed: Jan. 6, 2020

(65) Prior Publication Data
US 2021/0211851 A1    Jul. 8, 2021

(51) Int. Cl.
*H04W 4/46* (2018.01)
*H04L 29/08* (2006.01)
*H04W 48/10* (2009.01)
*H04L 67/10* (2022.01)
*H04W 84/12* (2009.01)
*H04W 84/20* (2009.01)

(52) U.S. Cl.
CPC .............. *H04W 4/46* (2018.02); *H04L 67/10* (2013.01); *H04W 48/10* (2013.01); *H04W 84/12* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 9,036,509 B1 * | 5/2015 | Addepalli | H04L 51/02 370/259 |
| 9,173,100 B2 | 10/2015 | Ricci | |
| 9,672,734 B1 | 6/2017 | Ratnasingam | |
| 10,178,601 B2 * | 1/2019 | Condeixa | H04W 40/12 |
| 10,602,329 B2 * | 3/2020 | Addepalli | H04L 51/02 |
| 10,616,751 B1 * | 4/2020 | Kanellakis | H04W 84/18 |
| 10,820,250 B2 * | 10/2020 | Vulgarakis Feljan | G08G 1/22 |
| 10,896,609 B2 * | 1/2021 | Higuchi | G08G 1/096844 |
| 11,038,895 B2 * | 6/2021 | Bartfai-Walcott | H04L 63/105 |

(Continued)

OTHER PUBLICATIONS

Lim, Jay W. Y. et al., "Performance Analysis of Parallel Computing in a Distributed Overlay Network," TENCON 2011, IEEE, 2011, 5 pages.

(Continued)

*Primary Examiner* — Tri H Phan
(74) *Attorney, Agent, or Firm* — Burbage Law, P.C.; Jon-Michael Burbage

(57) ABSTRACT

The disclosure includes embodiments for a connected vehicle to serve as a hub vehicle for a vehicular micro cloud that enables a set of vehicles to complete computational tasks that are more complicated than an individual vehicle can complete. In some embodiments, a method includes determining that an ego vehicle that includes the onboard vehicle computer is designated as a hub vehicle. The method includes broadcasting a wireless message that includes an invitation for remote vehicles in the limited geographic area to join a vehicular micro cloud managed by the ego vehicle. The method includes forming the vehicular micro cloud which includes the ego vehicle and a set of remote vehicles as members of the vehicular micro cloud. The method includes the ego vehicle serving as the hub vehicle for the vehicular micro cloud.

20 Claims, 3 Drawing Sheets

(56) References Cited

U.S. PATENT DOCUMENTS

| | | | |
|---|---|---|---|
| 11,106,794 B2* | 8/2021 | Chow | H04L 67/02 |
| 2006/0212931 A1 | 9/2006 | Shull et al. | |
| 2020/0092685 A1* | 3/2020 | Fehrenbach | H04B 7/2606 |
| 2021/0150909 A1* | 5/2021 | Lee | H04M 15/8083 |

OTHER PUBLICATIONS

Jiru, Josef, "Data Aggregation in VANETs: A Generalized Framework for Channel Load Adaptive Schemes," 39th Annual IEEE Conference on Local Computer Networks, LCN 2014, Edmonton, Canada, 2014, pp. 394-397.
Sanati, Jennifer, "Top 10 Reasons to Setup a Client-Server Network," retrieved from Internet at https://itpeernetwork.intel.com/top-10-reasons-to-setup-a-client-server-network/#gs.zidk36, May 2, 2011, 5 pages.
Lee, Euisin et al., "Vehicular Cloud Networking: Architecture and Design Principles," IEEE Communications Magazine 52.2, 2014, 8 pages.

* cited by examiner

VEHICULAR MICRO CLOUD HUBS

BACKGROUND

The specification relates to vehicular micro cloud hubs.

Connected vehicles form clusters of interconnected vehicles (e.g., via vehicle-to-everything, i.e., "V2X") that are located at a similar geographic location. Such clusters are known as "vehicular micro clouds."

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer program product for a vehicular micro cloud that includes a set of connected vehicles that are operable to collectively execute tasks which no single vehicle can execute due to computational limitations of the single vehicle, where the computer program product includes a non-transitory memory storing computer-executable code that, when executed by a processor, causes the processor to: determine, by the processor, that an ego vehicle that includes the processor is designated as a hub vehicle for a limited geographic area because the ego vehicle satisfies a threshold ability to provide vehicular micro cloud services, where the threshold indicates a level of trustworthiness, a level of onboard computer resources unused by the ego vehicle, and a quality of the onboard computer resources of the ego vehicle; broadcast, by a radio of the ego vehicle, a wireless message that includes an invitation for remote vehicles in the limited geographic area to join a vehicular micro cloud managed by the ego vehicle; form, by the processor, the vehicular micro cloud which includes the ego vehicle and a set of remote vehicles as members of the vehicular micro cloud; and serve, by the ego vehicle, as the hub vehicle for the vehicular micro cloud by providing, from the onboard computer resources which are unused by the ego vehicle and the set of remote vehicles, vehicular micro cloud services to the set of remote members so long as they are the members of the vehicular micro cloud which is managed by the ego vehicle, where the ego vehicle manages when the set of remote vehicles leave the vehicular micro cloud. Other embodiments of this aspect include corresponding computer systems, apparatus, and computer programs recorded on one or more computer storage devices, each configured to perform the actions of the methods.

One general aspect includes a method including: determining, by an onboard vehicle computer, that an ego vehicle that includes the onboard vehicle computer is designated as a hub vehicle for a limited geographic area because the ego vehicle satisfies a threshold ability to provide vehicular micro cloud services, where the threshold indicates a level of trustworthiness, a level of onboard computer resources unused by the ego vehicle, and a quality of the onboard computer resources of the ego vehicle; broadcasting, by a radio of the ego vehicle, a wireless message that includes an invitation for remote vehicles in the limited geographic area to join a vehicular micro cloud managed by the ego vehicle; forming, by the onboard vehicle computer, the vehicular micro cloud which includes the ego vehicle and a set of remote vehicles as members of the vehicular micro cloud; and serving, by the ego vehicle, as the hub vehicle for the vehicular micro cloud by providing, from the onboard computer resources which are unused by the ego vehicle and the set of remote vehicles, vehicular micro cloud services to the set of remote members so long as they are the members of the vehicular micro cloud which is managed by the ego vehicle, where the ego vehicle manages when the set of remote vehicles leave the vehicular micro cloud. Other embodiments of this aspect include corresponding computer systems, apparatus, and computer programs recorded on one or more computer storage devices, each configured to perform the actions of the methods.

Implementations may include one or more of the following features. The method where at least one of the remote vehicles is noncompliant with a standard for dedicated short-range communication. The method where a particular member of the vehicular micro cloud uses a regular wireless fidelity (Wi-Fi) interface to establish a communication link with the ego vehicle and transmit a wireless communication which is relayed by the ego vehicle. The method where the particular member is not equipped with vehicle-to-vehicle (V2V) communication so that the vehicular micro cloud services beneficially enable the particular member to join the vehicular micro cloud even though the particular member does not include a V2V communication radio which is ordinarily required to join the vehicular micro cloud. The method where the micro cloud services include a particular member of the vehicular micro cloud offloading a resource-intensive task to the ego vehicle and the ego vehicle completing the resource-intensive task for the particular member and providing digital data to the particular member that is an output of the resource-intensive task. The method where the resource-intensive task is a task that satisfies a predetermined threshold for complexity which is described by threshold data stored by the ego vehicle. The method where the ego vehicle is designated as the hub vehicle by a vehicle manufacturer which manufactured the ego vehicle and the onboard vehicle computer stores digital data that indicates that the hub vehicle is designated as the hub vehicle. The method where the ego vehicle is designated as the hub and determines how to use a pool of vehicular computing resources from the ego vehicle and the set of remote vehicles to complete a set of tasks in an order for the vehicular micro cloud and the order is determined based on a set of factors that includes safety. The method where the set of tasks does not include a task for the hub. The method further including designating a particular one of the remote vehicles as the hub to replace the ego vehicle responsive to determining that a quality of the onboard computer resources of the particular one of the remote vehicles exceeds the quality of the onboard computer resources of the ego vehicle. Implementations of the described techniques may include hardware, a method or process, or computer software on a computer-accessible medium.

One general aspect includes a system including: an ego vehicle including a communication unit that is communicatively coupled to a processor, where the processor is executing computer-executable code that is operable, when executed by the processor, to cause the processor to: determine, by the processor, that an ego vehicle that includes the processor is designated as a hub vehicle for a limited geographic area because the ego vehicle satisfies a threshold ability to provide vehicular micro cloud services, where the threshold indicates a level of trustworthiness, a level of onboard computer resources unused by the ego vehicle, and a quality of the onboard computer resources of the ego vehicle; broadcast, by the communication unit of the ego vehicle, a wireless message that includes an invitation for remote vehicles in the limited geographic area to join a vehicular micro cloud managed by the ego vehicle; form, by the processor, the vehicular micro cloud which includes the ego vehicle and a set of remote vehicles as members of the vehicular micro cloud; and serve, by the ego vehicle, as the hub vehicle for the vehicular micro cloud by providing, from the onboard computer resources which are unused by the ego vehicle and the set of remote vehicles, vehicular micro cloud services to the set of remote members so long as they are the members of the vehicular micro cloud which is managed by the ego vehicle, where the ego vehicle manages when the set of remote vehicles leave the vehicular micro cloud. Other embodiments of this aspect include corresponding computer systems, apparatus, and computer programs recorded on one or more computer storage devices, each configured to perform the actions of the methods.

Implementations may include one or more of the following features. The system where at least one of the remote vehicles is noncompliant with a standard for dedicated short-range communication. The system where a particular member of the vehicular micro cloud uses a regular wireless fidelity (Wi-Fi) interface to establish a communication link with the ego vehicle and transmit a wireless communication which is relayed by the ego vehicle. The system where the particular member is not equipped with vehicle-to-vehicle (V2V) communication so that the vehicular micro cloud services beneficially enable the particular member to join the vehicular micro cloud even though the particular member does not include a V2V communication radio which is ordinarily required to join the vehicular micro cloud. The system where the micro cloud services include a particular member of the vehicular micro cloud offloading a resource-intensive task to the ego vehicle and the ego vehicle completing the resource-intensive task for the particular member and providing digital data to the particular member that is an output of the resource-intensive task. The system where the resource-intensive task is a task that satisfies a predetermined threshold for complexity which is described by threshold data stored by the ego vehicle. The system where the ego vehicle is designated as the hub vehicle by a vehicle manufacturer which manufactured the ego vehicle which includes a non-transitory memory that stores digital data indicating that the hub vehicle is designated as the hub vehicle. The system where the ego vehicle is designated as the hub and determines how to use a pool of vehicular computing resources from the ego vehicle and the set of remote vehicles to complete a set of tasks in an order for the vehicular micro cloud and the order is determined based on a set of factors that includes safety. The system where the set of tasks does not include a task for the hub. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
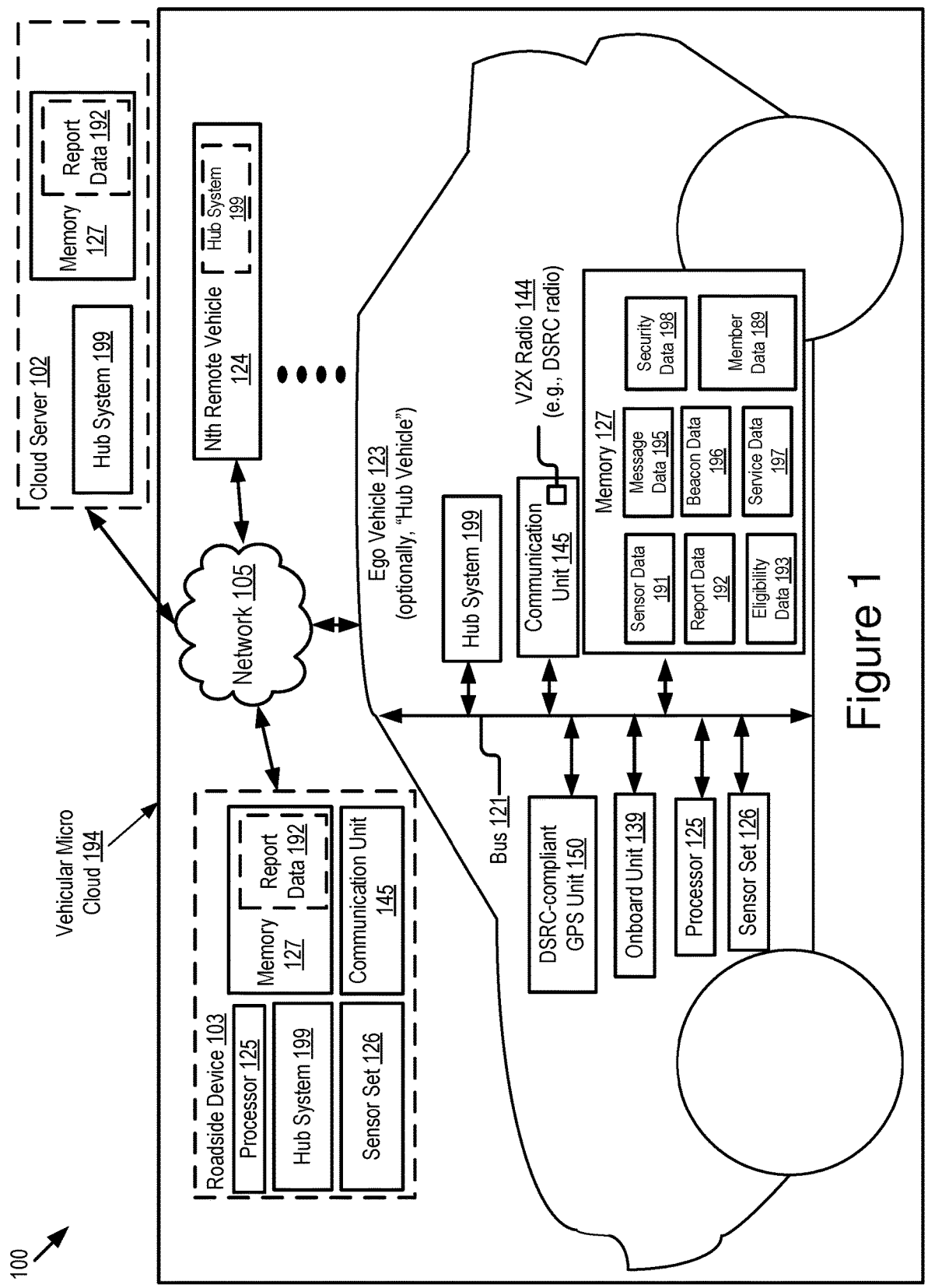
FIG. 1 is a block diagram illustrating an operating environment for a hub system according to some embodiments.

Our invention is motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over vehicle-to-vehicle (V2V) networks or V2X networks to perform computation, data storage, and data communication tasks in an efficient way. These types of tasks are referred to herein as "computational tasks."

Vehicular micro clouds are beneficial, for example, because they help vehicles to perform computationally expensive tasks that they could not perform alone or store large data sets that they could not store alone. The members that form a vehicular micro cloud may execute computing processes (e.g., such as those depicted in FIG. 3) together in parallel by a cooperative process. Individual steps of the computing processes may be executed by one or more vehicles in a collaborative fashion. The cooperative process may include the members exchanging V2X communications with one another that communicate outputs of their computations or digital data that may be beneficial to other members.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; a roadside device; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as a roadside device.

As used herein, the term "vehicle" refers to a connected vehicle. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

A problem is providing vehicular micro cloud services requires that the vehicular micro cloud be able to provide the following functionality: (1) rich computational resources; and (2) vehicle-to-vehicle (V2V) communication capability. Eventually an increasing number of vehicles will be able to provide these two functionalities. However, this is not currently the case. Described herein are embodiments of a hub system. Day-1 deployment of vehicular micro cloud services is currently limited because not enough vehicles have the following necessary functionality: (1) rich computational resources; and (2) V2V communication capability. An example purpose of the hub system is to provide a mechanism for a vehicular micro cloud to select a "hub vehicle" that has the necessary functionality that will allow the vehicular micro cloud to provide vehicular micro cloud services on day-1, and thus provide for day-1 deployment of vehicular micro cloud services and overcome the problem described above.

Example embodiments of the hub system are now described. In some embodiments, the hub system is software that is operable to improve the performance of a vehicular micro cloud by providing a mechanism for the vehicular micro cloud to select a "hub vehicle" that has the necessary functionality that will allow the vehicular micro cloud to provide vehicular micro cloud services on day-1. In some embodiments, the hub system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number.

In some embodiments, the hub system improves the performance of a vehicular micro could because it enables the hub vehicle to provide: (1) communication hub functionality; (2) service hub functionality; and (3) security hub functionality. These functionalities are now described according to some embodiments.

Communication Hub: In some embodiments, the hub system of the hub vehicle includes code and routines that are operable, when executed by a processor (e.g., of a hub vehicle), to cause the processor to serve as a mobile base station (e.g., Wi-Fi access point) that relays data messages between micro cloud members;

Service Hub: In some embodiments, the hub system includes code and routines that are operable, when executed by a processor (e.g., of a hub vehicle), to cause the processor to offer computational services, communication services, and data storage services to micro cloud members that have limited computational resources when compared to the hub vehicle; and Security Hub: In some embodiments, the hub system includes code and routines that are operable, when executed by a processor (e.g., of a hub vehicle), to cause the processor to monitor the behavior of each micro cloud member, determines which of these micro cloud members is a misbehaving vehicle (e.g., a potential security threat), and takes steps to exclude these misbehaving vehicles from membership in vehicular micro clouds.

The terms "communication hub," "service hub," and "security hub" as defined above are used in an example method which is described in the steps below. The hub system includes a non-transitory memory that stores digital data. Among this digital data incudes: message data; service data; and security data; The message data is related to, among other things, the functionality of the hub system as a communication hub. The service data is related to, among other things, the functionality of the hub system as a service hub. The security data is related to, among other things, the functionality of the hub system as a security hub.

In some embodiments, the hub system is software installed in an onboard unit (e.g., an electronic control unit (ECU)) of a vehicle having V2X communication capability. The Toyota vehicle is a connected vehicle and operates in a roadway environment with N number of remote vehicles that are also connected vehicles, where N is any positive whole number.

The ego vehicle and the remote vehicles may be human-driven vehicles, autonomous vehicles, or a combination of human-driven vehicles and autonomous vehicles.

Example General Method

In some embodiments, the hub system includes code and routines that are operable, when executed by the onboard unit, to cause the onboard unit to execute one or more steps of the following example general method:

Step 1: Receive a report message from one or more connected vehicles in a same or similar geographic region. In some embodiments, the report message is a V2X message that includes report data. The report data is digital data that describes one or more of the following about the vehicle that transmitted the report message: hardware configuration; trustworthiness, unused processing power; unused memory; whether the vehicle is capable of transmitting and receiving V2X messages; the types of V2X messages the vehicle is capable of transmitting and receiving; the V2X services the vehicle is capable of providing; the geographic location of the vehicle; the destination of the vehicle; the heading of the vehicle; the speed of the vehicle; and the path history of the vehicle.

Step 2: Compare the report data to the eligibility data to determine, out of the vehicles that transmitted report messages, which of these vehicles should be a hub vehicle. The eligibility data is digital data that describes the eligibility requirements for a vehicle to be designated as a hub vehicle for a vehicular micro cloud. For example, the eligibility data describes thresholds for one or more of the following: hardware configuration; trustworthiness, unused processing power; unused memory; whether the vehicle is capable of transmitting and receiving V2X messages; types of V2X messages the vehicle is capable of transmitting and receiving; the V2X services the vehicle is capable of providing; whether the vehicle is located in a particular geographic region; and the expected time that a vehicle is expected to be within a particular geographic region.

Step 3 (Election of a Hub Vehicle): Designate a particular vehicle as a hub vehicle based on the comparison described above. In some embodiments, this step may include providing a V2X message to the particular vehicle to inform them that they are designated as the hub vehicle and should provide functionality consistent with being a hub vehicle.

In some embodiments, a micro cloud operator (e.g., a vehicle OEM) is an entity that operates the cloud server and the edge server. The hub system that executes step 3 may be an element of one of these servers and its operation may be managed by the micro cloud operator. The micro cloud operator may select a hub vehicle based on predefined criteria such as: available network interfaces; available computational resources; and trust level. The cloud server and the edge server are optional features of the operating environment. For example, step 3(*b*) describes embodiments that do not require any servers.

In some embodiments, a micro cloud operator elects a hub vehicle in one or more of the following ways: pre-assign a set of authorized vehicles as hub vehicles; dynamically authenticate additional hub vehicles over a V2X network (e.g., cellular) according to demand for micro cloud services or other criteria; and a trusted hub vehicle can spawn new hub vehicles in their vicinity in case there is a need to do so (e.g., no server access or network problems).

In some embodiments, a micro cloud operator periodically checks the eligibility/trustworthiness of the existing hub vehicles to ensure that they never misbehave. If they do misbehave, then they are no longer eligible to be hub vehicles.

Step 4: The hub system of the hub vehicle periodically causes the communication unit of the hub vehicle to transmit a beacon message. In some embodiments, the beacon message is broadcast and not unicast. The beacon message includes beacon data. The beacon data is digital data that describes the transmitter of the beacon message as being a hub vehicle and invites other vehicles to join a vehicular micro cloud managed by the hub vehicle. The beacon message is a V2X message. Although the beacon message may be any type of V2X message, in some embodiments the beacon message is a Basic Safety Message broadcast in accordance with the SAE J2735 BSM standard, or a Cooperative Awareness Message broadcast in accordance with the ETSI standard TS 102 637-3 V1.1.1. Facts about hub vehicles are now described:

In some embodiments, each hub vehicle serves as a mobile base station (e.g., WiFi access point) and forms its own local area network (LAN).

In some embodiments, each hub vehicle creates one or more mobile vehicular micro clouds and serves as a leader of the micro cloud that other vehicles can anchor to.

In some embodiments, hub vehicles perform functionalities such as management of the resources and membership status of micro cloud members, allocation of data within the micro cloud, allocation of tasks within the micro cloud, etc.

Step 5: Other vehicles receive the beacon message. If these vehicles include an instance of the hub system, then the hub system of these vehicles establishes a communication link with the hub vehicle to become members of the vehicular micro cloud that is managed by the hub vehicle. These vehicles are now referred to as micro cloud members.

Step 6 (e.g., communication hub functionality): The hub system of the hub vehicle monitors for communications from micro cloud members. The hub system of the hub vehicle relays messages exchanged between micro cloud members.

In some embodiments, all the data messages exchanged among micro cloud members relayed by the hub vehicle. In this way, the hub vehicle serves as a communication hub for the micro cloud members. This beneficially allows vehicles that are not equipped with V2V communication to join a vehicular micro cloud. For example, vehicles can use a regular WiFi interface to establish a communication link with a hub vehicle. Even the driver or a passenger's smartphone may be used as a means of access to the hub vehicle.

Step 7 (e.g., service hub functionality): The hub system of the hub vehicle receives service requests from micro cloud members and provides vehicular micro cloud services that are consistent with these requests.

In some embodiments, micro cloud members can offload resource-intensive computational/communication tasks to hub vehicles or other micro cloud members as designated by the hub vehicle. In this way, the hub vehicle helps less technologically sophisticated vehicles to perform more complex tasks.

In some embodiments, hub vehicles may also aggregate sensor data that describes sensor observations collected from multiple micro cloud members and upload the aggregated data to a data center using cellular networks. This functionality beneficially helps reduce the cellular communication overhead and cost required for data collection as compared to having individual vehicles upload their own sensor data to the data center.

Step 8 (e.g., security hub functionality): The hub system of the hub vehicle monitors activity of each of its micro cloud members to determine if they are misbehaving, i.e., behaving in a manner that makes them a security threat or behavior that is indicative that a vehicle may be malicious. In some embodiments, if a security threat is detected, then it is removed from eligibility to be a member of the vehicular micro clouds provided by the micro cloud operator.

In some embodiments, hub vehicles maintain a "trust score" for each micro cloud member that describes the trustworthiness of that vehicle in light of its behavior in the past.

In some embodiments, if a trust score of a certain vehicle drops below a threshold, then the hub vehicle puts the vehicle on a blacklist which may be disseminated among hub vehicles thereby preventing blacklisted vehicles from joining other vehicular micro clouds.

Optionally, an instance of the hub system is also installed in a cloud server or an edge server that is communicatively coupled to the same wireless network as a vehicle (e.g., the ego vehicle) that also includes an instance of the hub system installed in its ECU.

Hub Vehicle

In some embodiments, the method includes a hub vehicle. For example, the vehicular micro cloud formed by the hub system includes a hub vehicle that provides the following example functionality: controlling when the set of member vehicles leave the vehicular micro cloud (i.e., managing the membership of the vehicular micro cloud, such as who can join, when they can join, when they can leave, etc.); determining how to use the pool of vehicular computing resources to complete a set of tasks in an order for the set of member vehicles wherein the order is determined based on a set of factors that includes safety; determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud.

In some embodiments, the hub vehicle is determined by a set of factors that indicate which vehicle is the most technologically sophisticated. For example, the member vehicle that has the fastest onboard computer may be the hub vehicle. Other factors that may qualify a vehicle to be the leader is having the most accurate sensors, most bandwidth, and most memory. Accordingly, the designation of which vehicle is the hub vehicle may be based on a set of factors that includes which vehicle has: (1) the fastest onboard computer; (2) the most accurate sensors; (3) the most bandwidth or other network factors such having radios compliant with the most modern network protocols; and (4) most available memory.

In some embodiments, the designation of which vehicle is the hub vehicle changes over time if a more technologically sophisticated vehicle joins the vehicular micro cloud. Accordingly, the designation of which vehicle is the hub vehicle is dynamic and not static. In other words, the designation of which vehicle is the hub vehicle can change on the fly if a "better" hub vehicle joins the vehicular micro cloud.

In some embodiments, the hub vehicle is whichever member vehicle of a vehicular micro cloud has a fastest onboard computer.

Priority Treatment of Safety Critical Scenarios:

In some embodiments, the hub system always considers safety when determining the order and speed in which tasks are completed. Safety critical scenarios are always completed first relative to other tasks (e.g., if eight vehicles have tasks that need to be completed, then the safety critical tasks will be completed first and/or will be allocated more computing resources relative to the other tasks). In some embodiments, the hub system calculates how quickly a safety critical scenario needs to be addressed and attempts to allocate enough computing resources so that the event which causes the safety critical scenario does not happen or is mitigated as much as possible (e.g., the hub system calculates that a collision will occur in two seconds and attempts to allocate enough computing resources to determine a driving maneuver that will either prevent the collision from occurring or minimize the impact of the collision).

Example Benefits

Example benefits of the hub system relative to the existing solutions are now described according to some embodiments.

In some embodiments, the hub system is operable to provide its functionality to operating environments and network architectures that do not include a server. Use of serves is problematic because they create latency. For example, some prior art systems require that groups of vehicles relay all their messages to one another through a server. By comparison, the use of server is an optional feature in for the hub system. Indeed, the preferred embodiment would not include a server since, for example: (1) inclusion of a server leads to undesirable latency; and (2) the computational power of the server is not needed by the vehicular micro clouds because the whole point of vehicular micro clouds is to harness the unused computational abilities of the fleet of vehicles that are on the roadway at any given time.

In some embodiments, the hub system is operable to provide its functionality even though the vehicle which includes the hub system does not have a Wi-Fi antenna as part of its communication unit. By comparison, some of the existing solutions require the use of a Wi-Fi antenna in order to provide their functionality. Because the hub system does not require a Wi-Fi antenna, it is able to provide its functionality to more vehicles, including older vehicles without Wi-Fi antennas.

In some embodiments, the hub system is operable to provide its functionality even though the vehicle which includes the hub system does not have a DSRC radio as part of its communication unit. By comparison, some of the existing solutions require the use of a DSRC radio in order to provide their functionality. Because the hub system does not require a DSRC radio, it is able to provide its functionality to more vehicles, including older vehicles without DSRC radios.

In some embodiments, the hub system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the hub system includes code and routines that, when executed by a processor, cause the processor to designate a particular vehicle to serve as a hub vehicle responsive to determining that the particular vehicle has sufficient unused computing resources and trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the hub system manages the vehicular micro cloud so that it is accessible for membership by vehicles which do not have V2V communication capability. This is beneficial because it ensures that legacy vehicles have access to the benefits provided by the vehicular micro cloud. The existing approaches do not provide this functionality.

In some embodiments, the hub system is configured so that a particular vehicle (e.g., the ego vehicle) is pre-designated by a vehicle manufacturer to serve as a hub vehicle for any vehicular micro cloud that it joins. The existing approaches do not provide this functionality.

With regards to leader vehicles, the existing solutions do not disclose or suggest that a vehicular micro cloud includes a leader vehicle that provides the following functionality: (1) controlling when the set of member vehicles leave the vehicular micro cloud; (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the leader vehicle; or (4) determining when the queue is no longer present and taking steps to dissolve the vehicular micro cloud.

The existing solutions do not disclose or suggest that the hub vehicle is whichever member vehicle that has the fastest onboard computer. The existing solutions also do not disclose or suggest that the designation of which vehicle is the hub vehicle may be based on a set of factors that includes which member vehicle has: the fastest onboard computer; most accurate sensors; most bandwidth or other network factors; and most available memory. The existing solutions also do not disclose or suggest that the designation of which vehicle is the hub vehicle may change over time if a more technologically sophisticated vehicle joins the vehicular micro cloud.

In some embodiments, the hub vehicle always uses the unused computing resources to benefit the members of the vehicular micro cloud, and not just for the benefit of the hub vehicle itself.

In some embodiments, the hub system always considers safety when determining the order and speed in which tasks are completed. Safety critical scenarios are always completed first relative to other tasks (e.g., if eight vehicles have tasks that need to be completed, then the safety critical tasks will be completed first and/or will be allocated more computing resources relative to the other tasks). The hub system also calculates how quickly a safety critical scenario needs to be addressed and attempts to allocate enough computing resources so that the event which causes the safety critical scenario does not happen or is mitigated as much as possible (e.g., the hub system calculates that a collision will occur in two seconds and attempts to allocate enough computing resources to determine a driving maneuver that will either prevent the collision from occurring or minimize the impact of the collision).

Vehicular Micro Clouds

The existing solutions generally do not include vehicular micro clouds. Many groups of vehicles might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one. Accordingly, any group of vehicles that includes a sever or whose functionality incorporates a server is not a vehicular micro cloud.

In some embodiments, a vehicular micro cloud is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does not serve the purpose of harnessing the unused computing resources of many different vehicles to perform complex computational tasks that a single vehicle alone cannot perform is not a vehicular micro cloud.

In some embodiments, the vehicular micro cloud can include vehicles that are parked, vehicles that are traveling in different directions, infrastructure devices, or almost any endpoint that is within communication range of a member of the vehicular micro cloud.

In some embodiments, vehicles are required to have a predetermined threshold of unused computing resources to become members of a vehicular micro cloud. In some embodiments, a leader of a vehicular micro cloud is pre-designated by a vehicle manufacturer by the inclusion of one a bit or a token in a memory of the vehicle that designates the vehicle as the leader of all vehicular micro clouds which it joins.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of the methods described herein (e.g., the example general method described above or the method depicted in FIG. 3) may be executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, the hub system enables a group of vehicles to perform computationally expensive tasks that could not be completed by any one vehicle in isolation.

Example Operating Environment

The hub system utilizes a vehicular network in some embodiments. A vehicular network includes, for example, one or more of the following: V2V; V2X; vehicle-to-network-to-vehicle (V2N2V); vehicle-to-infrastructure (V2I); any derivative or combination of the networks listed herein; and etc.

In some embodiments, the hub system includes software installed in an onboard unit of a connected vehicle or an onboard computer of a roadside device such as a Roadside Unit (RSU). This software is the "hub system" described herein.

An example operating environment for the embodiments described herein includes an ego vehicle and at least one remote vehicle. The ego vehicle and the remote vehicle are both connected vehicles having communication units that enable them to send and receive wireless messages via one or more vehicular networks. In some embodiments, both the ego vehicle and the remote vehicle include an onboard unit having a hub system stored therein.

In some embodiments, the hub system includes code and routines that are operable, when executed by a processor of the onboard unit, to cause the processor to execute one or more of the steps of the example general method which was described above.

This application is related to U.S. patent application Ser. No. 15/644,197 filed on Jul. 7, 2017 and entitled "Computation Service for Mobile Nodes in a Roadway Environment," the entirety of which is hereby incorporated by reference.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the HUB system 199 is operable to cooperate with the C-V2X radio and provide its functionality using the content of the C-V2X wireless messages.

In some of these embodiments, the message data 195 and/or the beacon data 196 depicted in FIG. 1 is the digital data that describes the payload for one or more C-V2X messages. In some embodiments, the C-V2X message is a Basic Safety Message.

In some embodiments, instances of "DSRC" as used herein may be replaced by the term "C-V2X." For example, the term "DSRC radio" is replaced by the term "C-V2X radio," the term "DSRC message" is replaced by the term "C-V2X message," and so on.

Embodiments of the hub system are now described. Referring now to FIG. 1, depicted is a block diagram illustrating an operating environment 100 for a hub system 199 according to some embodiments. The operating environment 100 is present in a geographic region so that each of the elements of the operating environment 100 is present in the same geographic region.

The operating environment 100 may include one or more of the following elements: an ego vehicle 123 (referred to herein as a "vehicle 123" or an "ego vehicle 123"); a roadside device 103; an Nth remote vehicle 124 (where "N" refers to any positive whole number greater than one); and a cloud server 102. These elements of the operating environment 100 are depicted by way of illustration. In practice, the operating environment 100 may include one or more of the elements depicted in FIG. 1. The Nth remote vehicle 124 may be referred to as a remote vehicle 124.

In some embodiments, the ego vehicle 123, the remote vehicle 124, the network 105, and the roadside device 103 may be elements of a vehicular micro cloud 194. The cloud server 102 is not an element of the vehicular micro cloud 194. The cloud server 102 and the roadside device 103 are depicted in FIG. 1 with a dashed line to indicate that they are optional features of the operating environment 100.

In the depicted embodiment, the ego vehicle 123, the remote vehicle 124, and the roadside device 103 include similar elements. For example, each of these elements of the operating environment 100 include their own processor 125, bus 121, memory 127, communication unit 145, processor 125, sensor set 126, and hub system 199. These elements of the ego vehicle 123, the remote vehicle 124, and the roadside device 103 provide the same or similar functionality relative to one another. Accordingly, these descriptions will not be repeated in this description.

In the depicted embodiment, the ego vehicle 123, remote vehicle 124, and the roadside device 103 may each store similar digital data.

The vehicular micro cloud 194 may be a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. In this patent application the vehicular micro cloud 194 may be a stationary vehicular micro cloud or a mobile vehicular micro cloud. Each of the ego vehicle 123, roadside device 103 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, the roadside device 103, etc.) which has completed a process to join the vehicular micro cloud 194 (e.g., a handshake process with the coordinator of the vehicular micro cloud 194). A member of the vehicular micro cloud 194 is described herein as a "member" or a "micro cloud member." In some embodiments, the memory 127 of one or more of the endpoints stores member data 189. The member data 189 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 189 describes logical associations between endpoints which are a necessary component of the vehicular micro cloud 194 and serves the differentiate the vehicular micro cloud 194 from a mere V2X network. In some embodiments, a vehicular micro cloud 194 must include a hub vehicle and this is a further differentiation from a vehicular micro cloud 194 and a V2X network.

The vehicular micro cloud 194 does not include a hardware server. Accordingly, the vehicular micro cloud 194 may be described as serverless.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote vehicle 124 are DSRC-equipped vehicles. In some embodiments, the roadside device 103 is a DSRC-equipped device. For example, the ego vehicle 123 includes a DSRC-compliant GPS unit 150 and a DSRC radio (e.g., the V2X radio 144 is a DSRC radio in embodiments where the ego vehicle 123 is a DSRC-equipped vehicle) and the roadside device 103 includes a communication unit 145 having a DSRC radio similar to the one included in the ego vehicle 123. The network 105 may include a DSRC communication channel shared among the ego vehicle 123 and a second vehicle.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a DSRC-compliant GPS unit 150; a communication unit 145; an onboard unit 139; a memory 127; and a hub system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the hub system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data 191 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data 191 that describes images or other measurements of the physical environment and objects or other vehicles present in the roadway environment such as pedestrians, animals, traffic signs, traffic lights, potholes, etc.

The physical environment may include a roadway region, parking lot, or parking garage that is proximate to the ego vehicle 123. The sensor data 191 may describe measurable aspects of the physical environment.

In some embodiments, the sensors of the sensor set 126 are operable to collect sensor data 191. The sensors of the sensor set 126 include any sensors that are necessary to measure and record the measurements described by the sensor data 191. In some embodiments, the sensor data 191 includes any measurements that are necessary to generate the other digital data stored by the memory 127. For example, the sensor data 191 describes the measurements which are used to generate the report data 192 in some embodiments.

In some embodiments, the sensor data 191 describes any of the information that is included in the report data 192. In some embodiments, the sensor set 126 includes any sensors that are necessary to record the information that is included in the report data 192.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the vehicle 123 may be accurately determined based on the GPS data for this vehicle 123 as provided by the DSRC-compliant GPS unit 150.

An example process for generating GPS data describing a geographic location of an object (e.g., the ego vehicle 123, the remote vehicle 124, or some other object located in a roadway environment) is now described according to some embodiments. In some embodiments, the sensor system 199 include code and routines that are operable, when executed by the processor 125, to cause the processor to: analyze (1) GPS data describing the geographic location of the ego vehicle 123 and (2) sensor data 191 describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the DSRC-compliant GPS unit 150 includes hardware that wirelessly communicates with a GPS satellite (or GPS server) to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the hub system 199 described herein may analyze the GPS data provided by the DSRC-compliant GPS unit 150 and determine what lane the ego vehicle 123 is traveling in based on the relative positions of two or more different vehicles (one of which is, for example, the ego vehicle 123) traveling on a roadway at the same time.

By comparison to the DSRC-compliant GPS unit 150, a conventional GPS unit which is not compliant with the DSRC standard is unable to determine the location of a vehicle 123 with lane-level accuracy. For example, a typical parking space is approximately 3 meters wide. However, a conventional GPS unit only has an accuracy of plus or minus 10 meters relative to the actual location of the ego vehicle 123. As a result, such conventional GPS units are not sufficiently accurate to enable the hub system 199 to determine the lane of travel of the ego vehicle 123. This measurement improves the accuracy of the GPS data describing the location of parking spaces used by the hub system 199 when providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the parking space is digital data that describes a geographic location of an object. One or more of these two types of GPS data may have lane-level accuracy. In some embodiments, one or more of these two types of GPS data are described by the sensor data 191.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting Basic Safety Message ("BSM message" if singular, or "BSM messages" if plural). In some embodiments, the non-transitory memory stores a buffered version of the GPS data for the ego vehicle 123 so that the GPS data for the ego vehicle 123 is broadcast as an element of the BSM messages which are regularly broadcast by the V2X radio 144 (e.g., at an interval of once every 0.10 seconds).

In some embodiments, the V2X radio 144 includes any hardware or software which is necessary to make the ego vehicle 123 compliant with the DSRC standards. In some embodiments, the DSRC-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 191; report data 192; eligibility data 193; message data 195; beacon data 196; service data 197; security data 198; and the member data 189.

The sensor data 191 is digital data that describes the environment of the connected vehicle. The sensor data 191 describes the measurements of the sensors included in the sensor set 126. In some embodiments, the hub system 199 includes code and routines that are operable, when executed by the processor 125, to cause the processor 125 to: execute or activate one or more sensors of the sensor set 126 to cause to record the sensor measurements that are described by the sensor data 191; and store these sensor measurements as the sensor data 191 in the memory 127.

The report data 192 is digital data that describes information included as the payload for a report message. For the purpose of convenience, the "report message" is described herein from this point forward as a "V2X message." However, persons having ordinary skill in the art will recognize that the report message may be any time of wireless message.

In some embodiments, the report data 192 is digital data that describes one or more of the following about the vehicle that transmitted the V2X message: hardware configuration; trustworthiness, unused processing power; unused memory; whether the vehicle is capable of transmitting and receiving V2X messages; the types of V2X messages the vehicle is capable of transmitting and receiving; the V2X services (i.e., computational tasks, or vehicular micro cloud services) the vehicle is capable of providing; the geographic location of the vehicle; the destination of the vehicle; the heading of the vehicle; the speed of the vehicle; and the path history of the vehicle.

In some embodiments, the report data 192 is the payload for a DSRC message or any other type of V2X message. In some embodiments, the ego vehicle 123 generates its own report data 192 using its own sensor data 191 and transmits V2X messages including this report data 192 as its payload. In some embodiments, the ego vehicle 123 uses the V2X radio 144 to broadcast DSRC messages including this report data 192 as its payload. In this way, other vehicles (such as the remote vehicle 124) may learn of the sensor measurements generated by the ego vehicle 123. These other vehicles also execute this process so that the ego vehicle 123 receives their sensor measurements.

In some embodiments, the DSRC messages (or V2X messages including report data 192) may be treated as a form of feedback that: confirms the accuracy of a vehicle's own sensor measurements; is used to improve the accuracy of these sensor measurements; or is used as an input to a learning algorithm that improves the accuracy of a vehicle's sensor measurements over time based on the feedback received from other vehicles.

In some embodiments, the report data 192 is digital data that describes the payload for a DSRC message or some other V2X message transmitted or received by the ego vehicle 123.

In some embodiments, the report data 192 is the payload for a V2X message that is received by the ego vehicle 123 where this V2X message was previously transmitted by one or more DSRC-enabled vehicles. For example, the V2X message is a DSRC message such as a BSM message. In some embodiments, each member of the vehicular micro cloud 194 broadcasts V2X messages that include the report data 192 that each member generates before joining the vehicular micro cloud 194. If the V2X message is a BSM message, then the report data 192 is an element of part 2 of the BSM data included in the payload for the BSM message.

The eligibility data 193 is digital data that describes the eligibility requirements for a vehicle to be designated as a hub vehicle for a vehicular micro cloud 194. For example, the eligibility data 193 describes thresholds for one or more of the following: hardware configuration; trustworthiness, unused processing power; unused memory; whether the vehicle is capable of transmitting and receiving V2X messages; types of V2X messages the vehicle is capable of transmitting and receiving; the V2X services the vehicle is capable of providing; whether the vehicle is located in a particular geographic region; and the expected time that a vehicle is expected to be within a particular geographic region.

The message data 195 includes digital data related to the functionality of the hub system 199 as a communication hub. In some embodiments, the hub system 199 includes code and routines that are operable, when executed by a processor 125, to cause the processor 125 to serve as a mobile base station (e.g., Wi-Fi access point) that relays data messages between micro cloud members (e.g., one or more of the following: remote vehicles 124; the ego vehicle 123; and the roadside device 103).

In some embodiments, the message data 195 describes any digital data that is necessary for the hub system 199 to provide its functionality as a communication hub. In some embodiments, some of the other data stored in the memory 127, in addition to the message data 195, may render the hub system 199 to be operable in providing its functionality as a communication hub.

The beacon data 196 is digital data that describes the transmitter of the beacon message as being a hub vehicle and invites other vehicles to join a vehicular micro cloud 194 managed by the hub vehicle. In some embodiments, the beacon message is a V2X message. Although the beacon message may be any type of V2X message, in some embodiments the beacon message is a BSM broadcast in accordance with the SAE J2735 BSM standard, or a Cooperative Awareness Message (CAM) broadcast in accordance with the ETSI standard TS 102 637-3 V1.1.1.

The service data 197 includes digital data related to the functionality of the hub system 199 as a service hub. In some embodiments, the hub system 199 includes code and routines that are operable, when executed by a processor 125, to cause the processor 125 to offer one or more of the following to micro cloud members: computational services; communication services; and data storage services. In some embodiments, the hub system only offers these services to micro cloud members that have limited computational resources when compared to the hub vehicle.

In some embodiments, the hub system 199 of the hub vehicle receives service requests from micro cloud members and provides vehicular micro cloud services that are consistent with these requests. The service data 197 is digital data that is an output of a vehicular micro cloud service. For example, the service data 197 is an output of a computational process executed by the vehicular micro cloud 194. The hub system 199 transmits a V2X message to the micro cloud member that requested the computational process and the V2X message includes the service data 197 as a component of its payload. In this way the hub system enables the hub vehicle to serve as a hub vehicle by providing vehicular micro cloud services to the members of the vehicular micro cloud.

In some embodiments, the hub system 199 offers computational services, communication services, and data storage services to micro cloud members that have limited computational resources when compared to the hub vehicle. In some embodiments, the service data 197 is the output or byproduct of these computational services, communication services, and data storage services.

In some embodiments, the service data 197 includes digital data that describes a set of computational tasks ("tasks") that are to be completed by the vehicular micro cloud 194. Each computational task may be subdivided into a set of sub-tasks. In some embodiments, the service data 197 is transmitted to the ego vehicle 123 by the cloud server 102 via the network 105. The service data 197 may include digital data that describes a task to be completed.

In some embodiments, the service data 197 describes any digital data that is necessary for the hub system 199 to provide its functionality as a service hub.

The security data 198 includes digital data related to the functionality of the hub system 199 as a security hub. In some embodiments, the hub system 199 includes code and routines that are operable, when executed by a processor, to cause the processor 125 to monitor the behavior of each micro cloud member (e.g., the remote vehicles 124), determines which of these micro cloud members is a misbehaving vehicle (e.g., a potential security threat), and take steps to exclude these misbehaving vehicles from membership in the vehicular micro cloud 194 (as well as other vehicle micro clouds, in some embodiments). The security data 198 includes digital data that describes, among other things, the behavior which indicates that a vehicle is misbehaving and/or a security threat, the actions that should be taken for misbehaving vehicles and/or security threats, and a list of unique identifies for vehicles that are barred from participation in vehicular micro clouds such as the vehicular micro cloud 194.

In some embodiments, the security data 198 includes any digital data that is necessary for the hub system 199 to provide its functionality as a security hub.

Figure 3:
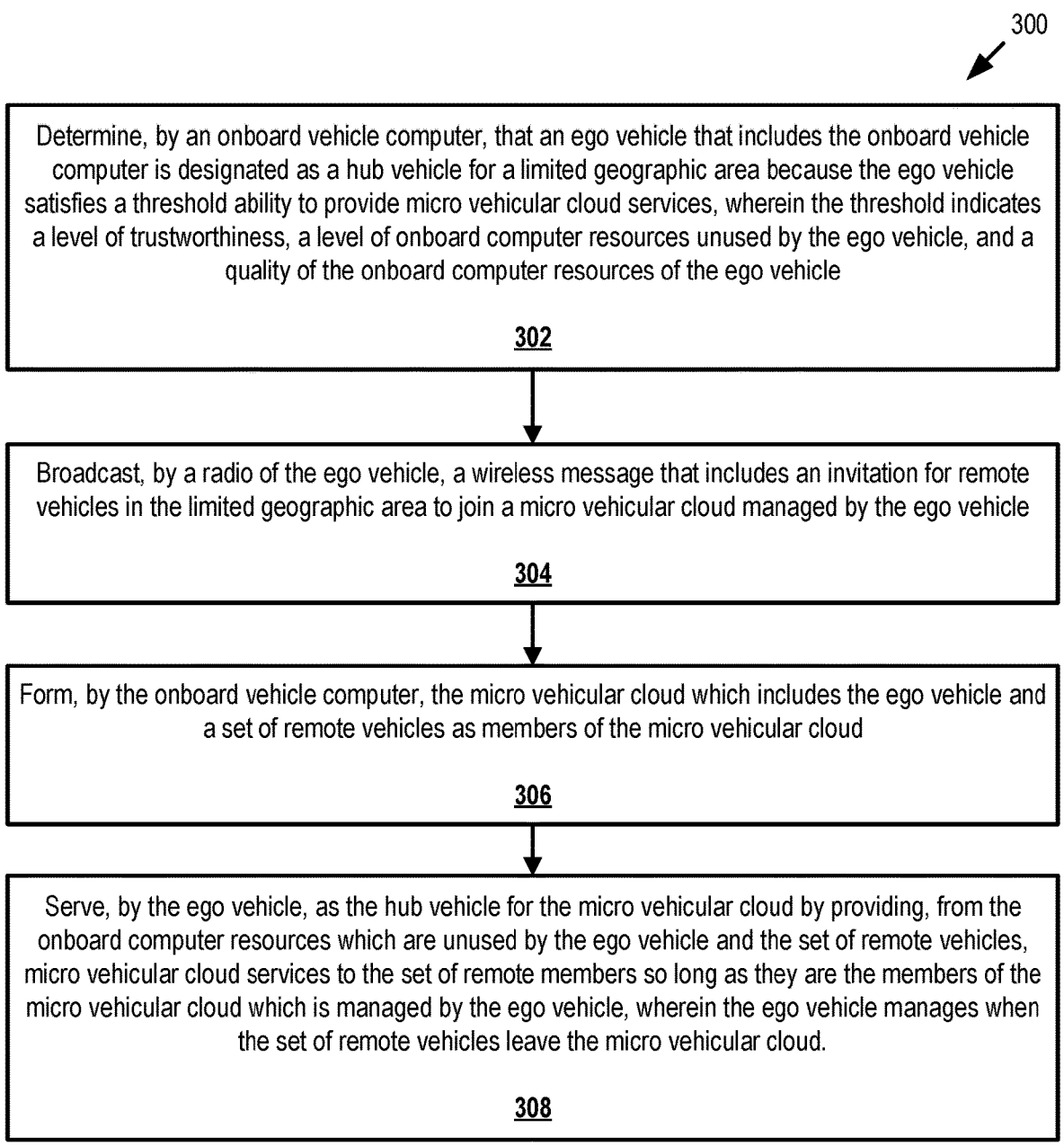
FIG. 3 is a flowchart of an example method for serving as a hub for a vehicular micro cloud according to some embodiments.

In some embodiments, the hub system 199 includes code and routines that are operable, when executed by the processor 125, to execute one or more steps of one or more of the method 300 described herein with reference to FIG. 3. In some embodiments, the hub system 199 includes code and routines that are operable, when executed by the processor 125, to execute one or more steps of the example general method described above.

In some embodiments, the hub system 199 is an element of the onboard unit 139 or some other onboard vehicle computer.

In some embodiments, the hub system 199 is implemented using hardware including a field-programmable gate array ("FPGA") or an application-specific integrated circuit ("ASIC"). In some other embodiments, the hub system 199 is implemented using a combination of hardware and software.

In some embodiments, the roadside device 103 is a device that (1) includes a communication unit 145 and a processor 125 and (2) is present in an environment (e.g., a roadway environment) with the ego vehicle 123. For example, the roadside device 103 is a roadside unit (RSU) or some other infrastructure device including the communication unit 145 and the processor 125 and present in the same environment as the ego vehicle 123.

As depicted, the roadside device 103 includes the following elements: a memory 127; a bus 121; a processor 125; a communication unit 145; a sensor set 126; and a hub system 199. These elements of the roadside device 103 provide similar functionality as those described above for the ego vehicle 123, and so, these descriptions will not be repeated here.

In some embodiments, the roadside device 103 is not an element of the vehicular micro cloud 194. In some embodiments, the roadside device 103 does not include a server.

The remote vehicle 124 includes elements and functionality which are similar to those described above for the ego vehicle 123, and so, those descriptions will not be repeated here. In some embodiments, the ego vehicle 123 and the remote vehicle 124 are located in a geographic region which is managed by the roadside device 103. For example, the roadside device 103 is a stationary connected device that is responsible for establishing and maintaining stationary vehicular micro clouds at a particular geographic location or within a particular geographic region that includes the geographic locations described by the GPS data of the ego vehicle 123, the remote vehicle 124, and the roadside device 103.

The cloud server 102 is a connected processor-based computing device that is not a member of the vehicular micro cloud 194 and includes an instance of the hub system 199 and a memory 127. In some embodiments, the memory 127 stores at least one instance of the report data 192. For example, the cloud server 102 is one or more of the following: a hardware server; a personal computer; a laptop; a device such as the roadside device 103 which is not a member of the vehicular micro cloud 194; or any other processor-based connected device that is not a member of the vehicular micro cloud 194 and includes an instance of the hub system 199 and a non-transitory memory that stores at least one instance of task data 198. The cloud server 102 may include a backbone network.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123 and the remote vehicle 124), and optionally devices such as the roadside device 103, form a cluster of interconnected vehicles that are located at a same geographic region. These connected vehicles (and, optionally, connected devices) are interconnected via Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 102. Connected vehicles (and devices such as the roadside device 103) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the hub system 199 includes encryption keys for encrypting wireless messages and decrypting the wireless messages described herein.

Figure 2:
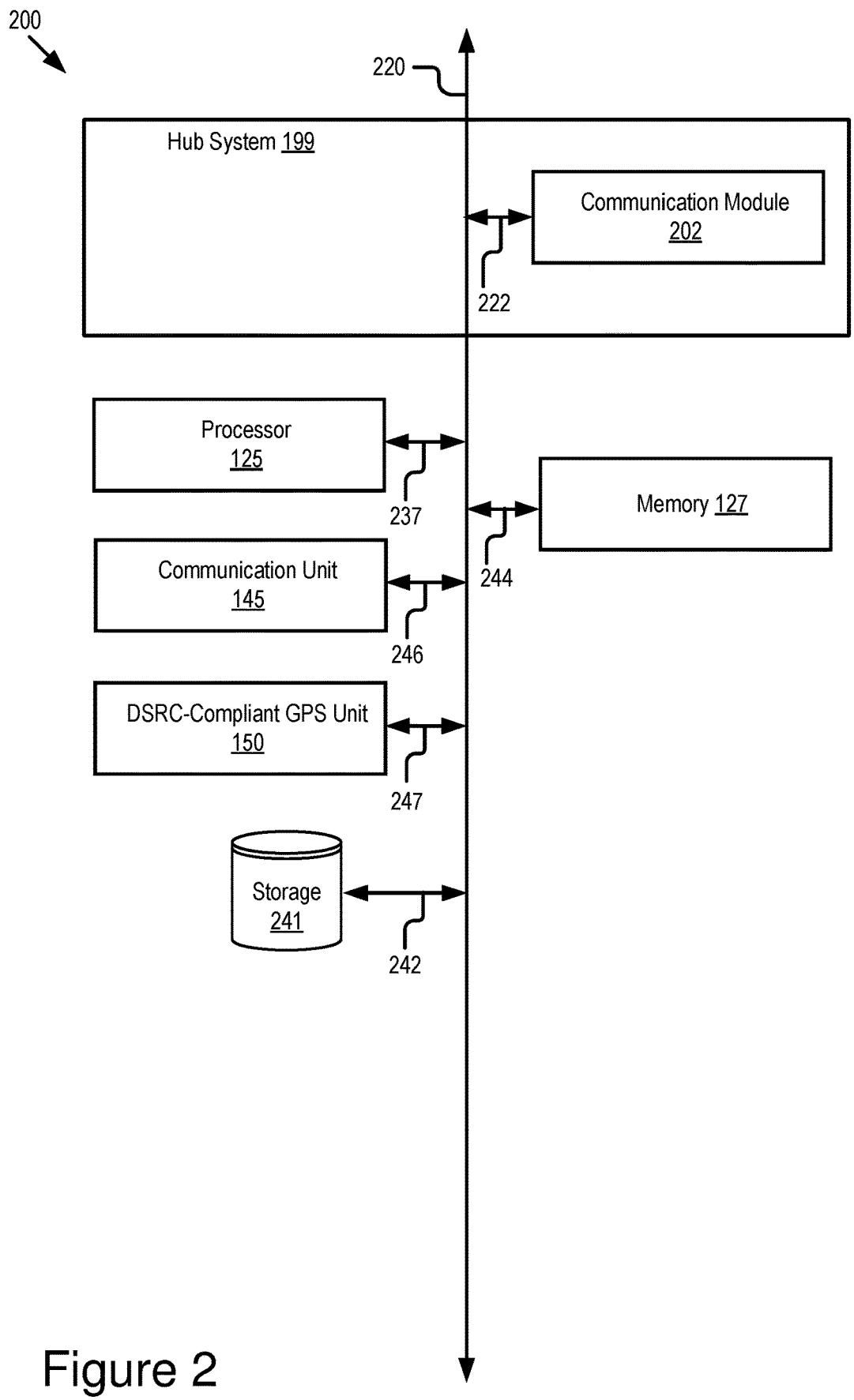
FIG. 2 is a block diagram illustrating an example computer system including a hub system according to some embodiments.

Referring now to FIG. 2, depicted is a block diagram illustrating an example computer system 200 including a hub system 199 according to some embodiments.

In some embodiments, the computer system 200 may include a special-purpose computer system that is programmed to perform one or more steps of one or more of the method 300 described herein with reference to FIG. 3. In some embodiments, the computer system 200 may include a special-purpose computer system that is programmed to perform one or more steps of one or more of the example general method described above.

In some embodiments, the computer system 200 may include a processor-based computing device. For example, the computer system 200 may include an onboard vehicle computer system of the ego vehicle 123 or the remote vehicle 124; the computer system 200 may also include an onboard computer system of the roadside device 103.

The computer system 200 may include one or more of the following elements according to some examples: the hub system 199; a processor 125; a communication unit 145; a DSRC-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the DSRC-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the hub system 199 includes code and routines that are operable, when executed by the processor 125, to cause the processor 125 to execute one or more steps of the method 300 described herein with reference to FIG. 3. In some embodiments, the hub system 199 includes code and routines that are operable, when executed by the processor 125, to cause the processor 125 to execute one or more steps of the example general method described above.

In the illustrated embodiment shown in FIG. 2, the hub system 199 includes a communication module 202.

The communication module 202 can be software including routines for handling communications between the hub system 199 and other components of the computer system 200. In some embodiments, the communication module 202 can be a set of instructions executable by the processor 125 to provide the functionality described below for handling communications between the hub system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the hub system 199 and stores the data in one or more of the storage 241 and the memory 127.

In some embodiments, the communication module 202 may handle communications between components of the hub system 199 or the computer system 200.

Referring now to FIG. 3, depicted is a flowchart of an example method 300. The method 300 includes steps 302, 304, 306, and 308 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory storing computer-executable code that, when executed by a processor, causes the processor to:

determine, by the processor, that an ego vehicle that includes the processor is designated as a hub vehicle for a geographic area because the ego vehicle satisfies a threshold requirement to provide vehicular micro cloud services, wherein the threshold requirement indicates a level of trustworthiness, a level of onboard computer resources unused by the ego vehicle, and a quality of the onboard computer resources of the ego vehicle;

broadcast, by a radio of the ego vehicle, a wireless message that includes an invitation for remote vehicles in the geographic area to join a vehicular micro cloud managed by the ego vehicle;

form, by the processor, the vehicular micro cloud;

generate a trust score for each member of the vehicular micro cloud;

responsive to the trust score for a corresponding member falling below a trust threshold, add the corresponding member to a blacklist; and disseminate the blacklist to other hub vehicles to prevent the corresponding member from joining other vehicular micro clouds.

2. A method comprising:

determining, by an onboard vehicle computer, that an ego vehicle that includes the onboard vehicle computer is designated as a hub vehicle for a geographic area because the ego vehicle satisfies a threshold requirement to provide vehicular micro cloud services, wherein the threshold requirement indicates a level of trustworthiness, a level of onboard computer resources unused by the ego vehicle, and a quality of the onboard computer resources of the ego vehicle;

broadcasting, by a radio of the ego vehicle, a wireless message that includes an invitation for remote vehicles in the geographic area to join a vehicular micro cloud managed by the ego vehicle;

forming, by the onboard vehicle computer, the vehicular micro cloud;

generating a trust score for each member of the vehicular micro cloud;

responsive to the trust score for a corresponding member falling below a trust threshold, adding the corresponding member to a blacklist; and disseminating the blacklist to other hub vehicles to prevent the corresponding member from joining other vehicular micro clouds.

3. The method of claim 2, further comprising:

dynamically authenticating the remote vehicles over a vehicle-to-everything (V2X) network based on a demand for micro cloud services.

4. The method of claim 2, wherein a particular member of the vehicular micro cloud uses a regular Wireless Fidelity (Wi-Fi) interface to establish a communication link with the ego vehicle and transmit a wireless communication which is relayed by the ego vehicle.

5. The method of claim 4, wherein the particular member is not equipped with Vehicle-to-Vehicle (V2V) communication but that the vehicular micro cloud services join the particular member with the vehicular micro cloud even though the particular member does not include a V2V communication radio which is ordinarily required to join the vehicular micro cloud.

6. The method of claim 2, wherein the vehicular micro cloud services include a particular member of the vehicular micro cloud offloading a resource-intensive task to the ego vehicle and the ego vehicle completing the resource-intensive task for the particular member and providing digital data to the particular member that is an output of the resource-intensive task.

7. The method of claim 6, wherein the resource-intensive task is a task that satisfies a predetermined threshold for complexity which is described by threshold data stored by the ego vehicle.

8. The method of claim 2, wherein the ego vehicle is designated as the hub vehicle for the vehicular micro cloud by a vehicle manufacturer which manufactured the ego vehicle and the onboard vehicle computer stores digital data that indicates that the hub vehicle is designated as the hub vehicle.

9. The method of claim 2, wherein:

the vehicular micro cloud includes the ego vehicle and a set of remote vehicles;

the ego vehicle determines how to use a pool of vehicular computing resources from the ego vehicle and the set of remote vehicles to complete a set of tasks in an order for the vehicular micro cloud; and the order is determined based on a set of factors that includes safety.

10. The method of claim 9, wherein the set of tasks does not include a task for the hub vehicle.

11. The method of claim 2, further comprising designating a particular one of the remote vehicles as the hub vehicle for the vehicular micro cloud to replace the ego vehicle as the hub vehicle responsive to determining that a quality of the onboard computer resources of the particular one of the remote vehicles exceeds the quality of the onboard computer resources of the ego vehicle.

12. A system comprising:

an ego vehicle including a communication unit that is communicatively coupled to a processor, wherein the processor is executing computer-executable code that is operable, when executed by the processor, to cause the processor to:

determine, by the processor, that the ego vehicle that includes the processor is designated as a hub vehicle for a geographic area because the ego vehicle satisfies a threshold requirement to provide vehicular micro cloud services, wherein the threshold requirement indicates a level of trustworthiness, a level of onboard computer resources unused by the ego vehicle, and a quality of the onboard computer resources of the ego vehicle;

broadcast, by the communication unit of the ego vehicle, a wireless message that includes an invitation for remote vehicles in the geographic area to join a vehicular micro cloud managed by the ego vehicle;

form, by the processor, the vehicular micro cloud;

generate a trust score for each member of the vehicular micro cloud;

responsive to the trust score for a corresponding member falling below a trust threshold, add the corresponding member to a blacklist; and disseminate the blacklist to other hub vehicles to prevent the corresponding member from joining other vehicular micro clouds.

13. The system of claim 12, wherein the computer-executable code is further operable to cause the processor to:

dynamically authenticating the remote vehicles over a vehicle-to-everything (V2X) network based on a demand for micro cloud services.

14. The system of claim 12, wherein a particular member of the vehicular micro cloud uses a regular Wireless Fidelity (Wi-Fi) interface to establish a communication link with the ego vehicle and transmit a wireless communication which is relayed by the ego vehicle.

15. The system of claim 14, wherein the particular member is not equipped with Vehicle-to-Vehicle (V2V) communication but that the vehicular micro cloud services join the particular member with the vehicular micro cloud even though the particular member does not include a V2V communication radio which is ordinarily required to join the vehicular micro cloud.

16. The system of claim 12, wherein the vehicular micro cloud services include a particular member of the vehicular micro cloud offloading a resource-intensive task to the ego vehicle and the ego vehicle completing the resource-intensive task for the particular member and providing digital data to the particular member that is an output of the resource-intensive task.

17. The system of claim 16, wherein the resource-intensive task is a task that satisfies a predetermined threshold for complexity which is described by threshold data stored by the ego vehicle.

18. The system of claim 12, wherein the ego vehicle is designated as the hub vehicle for the vehicular micro cloud by a vehicle manufacturer which manufactured the ego vehicle and the processor stores digital data that indicates that the hub vehicle is designated as the hub vehicle.

19. The system of claim 12, wherein:
the vehicular micro cloud includes the ego vehicle and a set of remote vehicles;
the ego vehicle determines how to use a pool of vehicular computing resources from the ego vehicle and the set of remote vehicles to complete a set of tasks in an order for the vehicular micro cloud; and
the order is determined based on a set of factors that includes safety.

20. The system of claim 19, wherein the set of tasks does not include a task for the hub vehicle.

* * * * *